United States Patent
Sunde

(10) Patent No.: US 10,118,630 B1
(45) Date of Patent: Nov. 6, 2018

(54) TRUCK-MOUNTED BRAKE SYSTEM

(71) Applicant: Strato, Inc., Piscataway, NJ (US)

(72) Inventor: Jonathan Sunde, Somerset, NJ (US)

(73) Assignee: STRATO, INC., Piscataway, NJ (US)

( * ) Notice: Subject to any disclaimer, the term of this patent is extended or adjusted under 35 U.S.C. 154(b) by 0 days.

(21) Appl. No.: 15/660,435

(22) Filed: Jul. 26, 2017

(51) Int. Cl.
*B61H 13/32* (2006.01)
*B61H 15/00* (2006.01)

(52) U.S. Cl.
CPC ......... *B61H 13/32* (2013.01); *B61H 15/0042* (2013.01)

(58) Field of Classification Search
CPC ....... B60T 8/1893; B61H 13/24; B61H 13/32; B61H 13/36; B61H 15/0042
See application file for complete search history.

(56) References Cited

U.S. PATENT DOCUMENTS

| | | | | |
|---|---|---|---|---|
| 2,339,440 A | * | 1/1944 | Tramblie | B61H 13/32 188/195 |
| 2,374,002 A | * | 4/1945 | Down | B61H 13/32 188/195 |
| 2,385,139 A | | 9/1945 | Kelley | |
| 3,442,358 A | | 5/1969 | Mersereau | |
| 3,690,420 A | * | 9/1972 | Natschke | B61H 13/32 188/195 |
| 4,080,005 A | | 3/1978 | Engle | |
| 4,771,868 A | | 9/1988 | Haydu | |
| 4,830,148 A | * | 5/1989 | Hart | B61H 13/36 188/219.1 |
| 5,069,312 A | * | 12/1991 | Kanjo | B61H 13/02 188/33 |
| 5,259,485 A | * | 11/1993 | Jackson | B61H 15/0014 188/198 |
| 5,551,766 A | * | 9/1996 | Brushwood | B60T 8/185 303/22.2 |
| 6,378,668 B1 | | 4/2002 | Zemyan et al. | |
| 6,702,073 B2 | | 3/2004 | Sommerfeld | |
| 7,416,262 B2 | * | 8/2008 | Ring | B60T 8/1893 188/151 R |
| 7,802,662 B2 | | 9/2010 | Sommerfeld et al. | |
| 7,896,140 B2 | | 3/2011 | Heitmeyer | |
| 8,978,841 B2 | * | 3/2015 | Ring | B61H 13/36 188/124 |
| 9,540,020 B2 | * | 1/2017 | Sunde | B61H 13/32 |
| 9,908,541 B2 | * | 3/2018 | Centeno | B61H 13/36 |
| 2004/0003971 A1 | | 1/2004 | Sommerfeld | |
| 2006/0067174 A1 | | 3/2006 | Hsu et al. | |
| 2006/0181142 A1 | * | 8/2006 | Hettinger | B60T 8/185 303/22.7 |
| 2008/0035432 A1 | * | 2/2008 | Ring | B61H 13/02 188/52 |
| 2008/0179144 A1 | | 7/2008 | Sommerfeld et al. | |

(Continued)

*Primary Examiner* — Thomas W Irvin
(74) *Attorney, Agent, or Firm* — Pearl Cohen Zedek Latzer Baratz LLP

(57) ABSTRACT

A truck mounted braking system is provided with a mechanical pivot adjustment on a lever connected to the brake actuator to permit the braking force applied to the wheels to vary depending on the lading condition of the car, without involving additional pneumatic elements such as a pneumatic empty load device. The system adjusts the braking force applied when the hand brake is activated, even when the railway car is disconnected from the pneumatic brake line.

8 Claims, 4 Drawing Sheets

(56) References Cited

U.S. PATENT DOCUMENTS

2011/0147140 A1 6/2011 Ring
2015/0321681 A1 11/2015 Sunde
2016/0229428 A1 8/2016 Sunde

* cited by examiner

TRUCK-MOUNTED BRAKE SYSTEM

FIELD OF THE INVENTION

The invention relates to braking systems for a railway car and improvements thereof and particularly to truck-mounted braking systems.

BACKGROUND OF THE INVENTION

The conventional railway car truck in use in North America for several decades has been the three-piece truck, comprising a pair of parallel side frames oriented longitudinally and connected by a transversely mounted bolster. The bolster is supported on the side frames by spring sets. The wheel sets of the truck are received in bearing adapters placed in leading and trailing pedestal jaws in the side frame. The railway car is mounted on the center plate of the bolster, which allows the truck to pivot with respect to the car.

Braking systems for the railway car transmit force from a pneumatic or hydraulic actuator to cause the brake shoes to be applied against the wheels. Such systems may comprise "foundational" rigging, having components distributed on the railway car, or alternatively, may be mounted on the truck in a truck-mounted system. In either case, there is always a premium on the available space on the car body or on the truck for the necessary components so that the parts do not interfere with other systems on the railway car.

A truck-mounted braking system typically comprises two brake beams transversely mounted with respect to a longitudinal axis of the railway car and having brake shoes on opposite ends. Each brake beam typically comprises a compression member and a tension member connected in the middle by a strut. The brake beams may be connected by a brake actuator assembly comprising an actuator (such as an air cylinder) mounted on one of the beams, and a push rod oriented longitudinally between the brake beams, so that when the brake is applied, the brake actuator assembly forces the beams apart, causing force to be transmitted to the brake shoes which press against the wheels. The truck-mounted system is characterized by having fewer elements between the brake actuator and the wheels, compared to a foundational rigging system.

A conventional truck-mounted brake system may also comprise a slack adjuster assembly, as disclosed in U.S. Patent Application Publication No. 2016/0229428 to Sunde, which is incorporated by reference in its entirety. The slack adjuster may be mounted in tandem with the brake actuator assembly, such that the brake actuator assembly and the slack adjuster are connected to the respective brake beams by a pair of levers. The slack adjuster transmits force between the brake beams and adjusts the distance between the brake beams to accommodate for wear on the brake pads. It is characteristic of the truck-mounted systems that the slack adjuster and the brake actuator are situated between the levers on opposed brake beams.

Braking ratio is the ratio of braking force applied on the railway car wheels to the weight of the railway car. The American Association of Railroads ("AAR") sets a standard (AAR S-401-99) for the brake ratio for a loaded car at a maximum of 14%, and for an empty car at 32%. In addition, the AAR requires a minimum braking ratio of 11% for an air brake and 10% for a hand brake. The danger of exceeding braking ratios is that the brake shoes may become locked against the wheels, so that the wheels fail to turn and are pushed along the rails. Therefore, it is desired to be able to adjust the brake force applied against the wheels depending on the lading condition of the railway car.

Braking systems for railway cars universally include a hand brake, operated manually and independently of the pneumatic brake system. A hand brake for a foundational brake rigging system is described in U.S. Pat. No. 7,896,140 to Heitmeyer, incorporated by reference. A hand brake (and hand brake lever) for a truck-mounted braking system is described in U.S. Pat. No. 6,702,073 to Sommerfeld, also incorporated by reference. In a truck-mounted system, the hand brake may be connected to one end of the live lever, actuated manually, usually to secure an unattended or unpowered car against unplanned movement, i.e., as a "parking brake". Thus the hand brake is capable of operating even when the pneumatic brake is not on line. Conventionally, the hand brake applies the same force to the wheels whether the car is loaded or unloaded, being independent of the brake pneumatics.

So-called "empty load devices" are known which operate in conjunction with pneumatic systems, to maintain braking forces below a certain brake ratio depending on the sensed weight of the car. U.S. Pat. No. 4,080,005, which is incorporated by reference, discloses an empty load fluid pressure brake system with a proportioning valve, operated with compressed air. By way of example and not limitation, a mechanical empty load device used with a foundational brake rigging system is disclosed in U.S. Pat. No. 3,690,420 to Natschke, which is also incorporated by reference. The braking systems disclosed in this patent is characterized by an outboard arrangement of the load sensing device and the brake actuator.

Further examples of a truck-mounted braking system of the type described above are provided in U.S. Patent Application Publication No. 2011/0147140 to Ring, and U.S. Pat. No. 7,802,662, also incorporated by reference in their entirety. These additional disclosures teach various methods and apparatuses for preventing or limiting brake lock-out and for monitoring and controlling travel of the brake elements generally.

SUMMARY OF THE INVENTION

Railway cars have become lighter and the laded weights of the cars have become heavier over time. Therefore, it is desired to improve the efficiency with which a different brake load is applied to the brakes in an empty car versus a fully loaded car.

In one aspect, the invention is a mechanical brake ratio adjustment mechanism for a truck-mounted braking system.

In another aspect, the invention achieves brake ratio adjustment based on the lading condition of a railway car while avoiding the use of a pneumatically operated empty load device, relying instead on a mechanical adjustment based on the loaded or unloaded condition of the railway car.

In still another aspect, the invention alters the braking force applied to the wheels when a manually operated hand brake is applied, based on a mechanical pivot adjustment of the brake lever depending on the lading condition of the railway car, independently of whether a pneumatic brake system is on-line.

These and other objects of the invention may be achieved with a truck-mounted braking system for a railway car, wherein a first brake beam and a second brake beam are separated along a longitudinal axis of the railway car, the first and second brake beams each having a compression member and a tension member, and a respective first and second strut attached between the respective compression member and tension member. A brake actuator is mounted between the brake beams, and a brake actuator lever connection is connected to the brake actuator and adapted to move linearly in response to the brake actuator. A live lever is pivotally attached to the first strut on the first brake beam by a pin, pivotally attached to the brake actuator lever connection, and pivotally attached at an end of the live lever to a slack adjuster. A dead lever is pivotally attached to the second strut on the second brake beam, pivotally attached at one end to the slack adjuster, and pivotally attached at an end opposite said one end, directly or indirectly, to the brake actuator. A pivot adjustment hole is provided in the live lever and/or the dead lever to receive the pin in at least two different positions in the hole, corresponding to at least two lading conditions of the railway car.

DETAILED DESCRIPTION OF THE INVENTION

Directions and orientations herein may refer to the normal orientation of a railway car in use. Thus, unless the context clearly requires otherwise, the "longitudinal" axis or direction is parallel to the rails and in the direction of movement of the railway car on the track in either direction. The "transverse" or "lateral" axis or direction is in a horizontal plane perpendicular to the longitudinal axis and the rail. Individual components of a braking system may also have a length and "longitudinal axis", a width and a "lateral axis". Thus, a brake lever, for example, which is oriented substantially in line with the transversely mounted brake beam, has a longitudinal axis of its own, which may be nearly perpendicular to the longitudinal axis of the railway car. The term "inboard" means toward the center of the car, and may mean inboard in a longitudinal direction, a lateral direction, or both. Similarly, "outboard" means away from the center of the car. "Vertical" is the up-and-down direction, and "horizontal" is a plane parallel to the rails including the transverse and longitudinal axes.

Specific dimensions in the railway industry are often established by standards. Therefore, dimensions provided herein are intended to be approximate and descriptive only, because it is understood that ultimately the given dimension may be altered or varied to accommodate a particular AAR standard. In the same spirit, the word "about", used in combination with a specific quantity, means+/−15%. The word "substantially" means all or completely, with some variation allowed for inevitable departure from exactitude as would be understood and accepted by a person having ordinary skill in the art.

Figure 1:
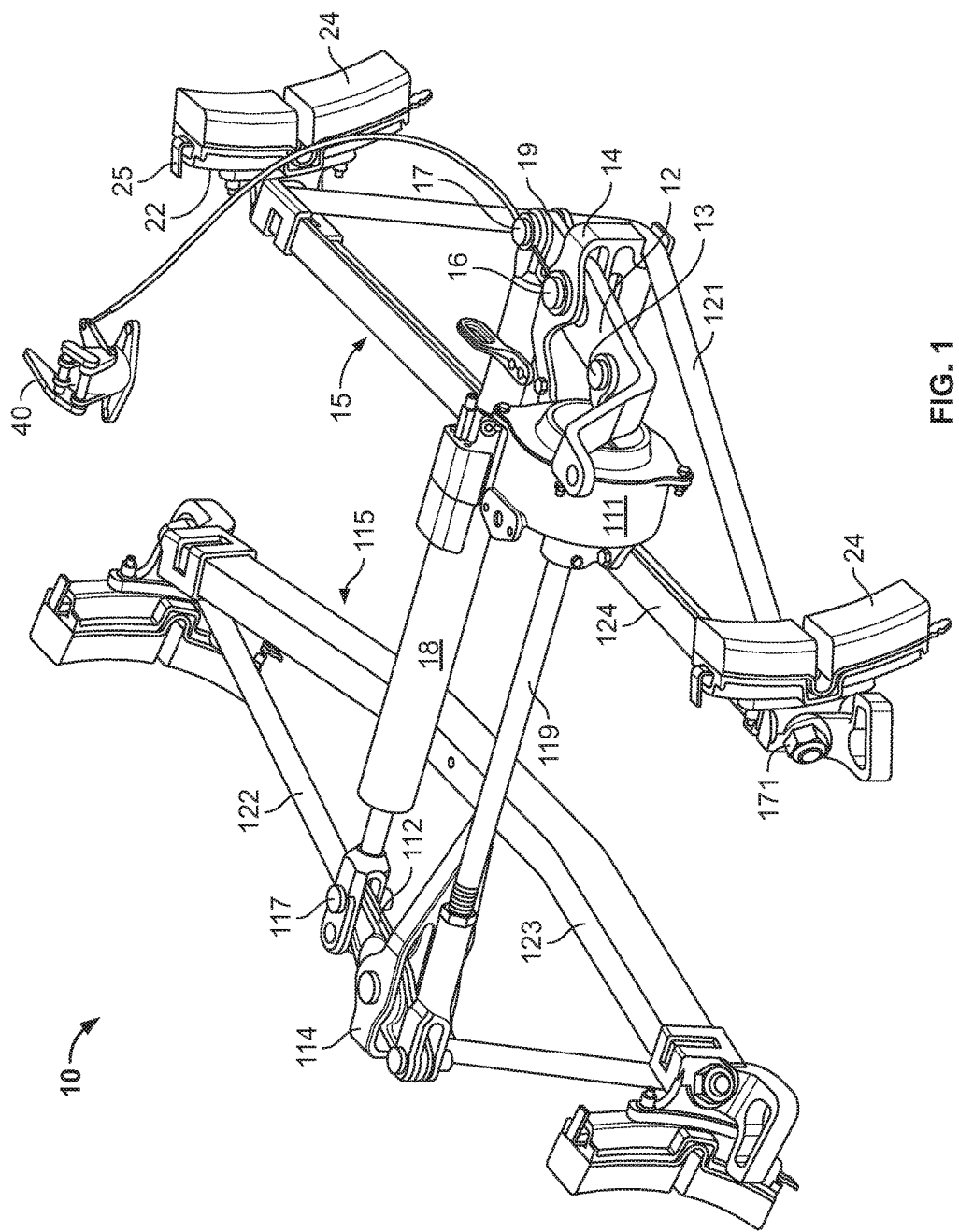
FIG. 1 schematically depicts a truck-mounted braking system according to an embodiment of the invention.
Figure 2:
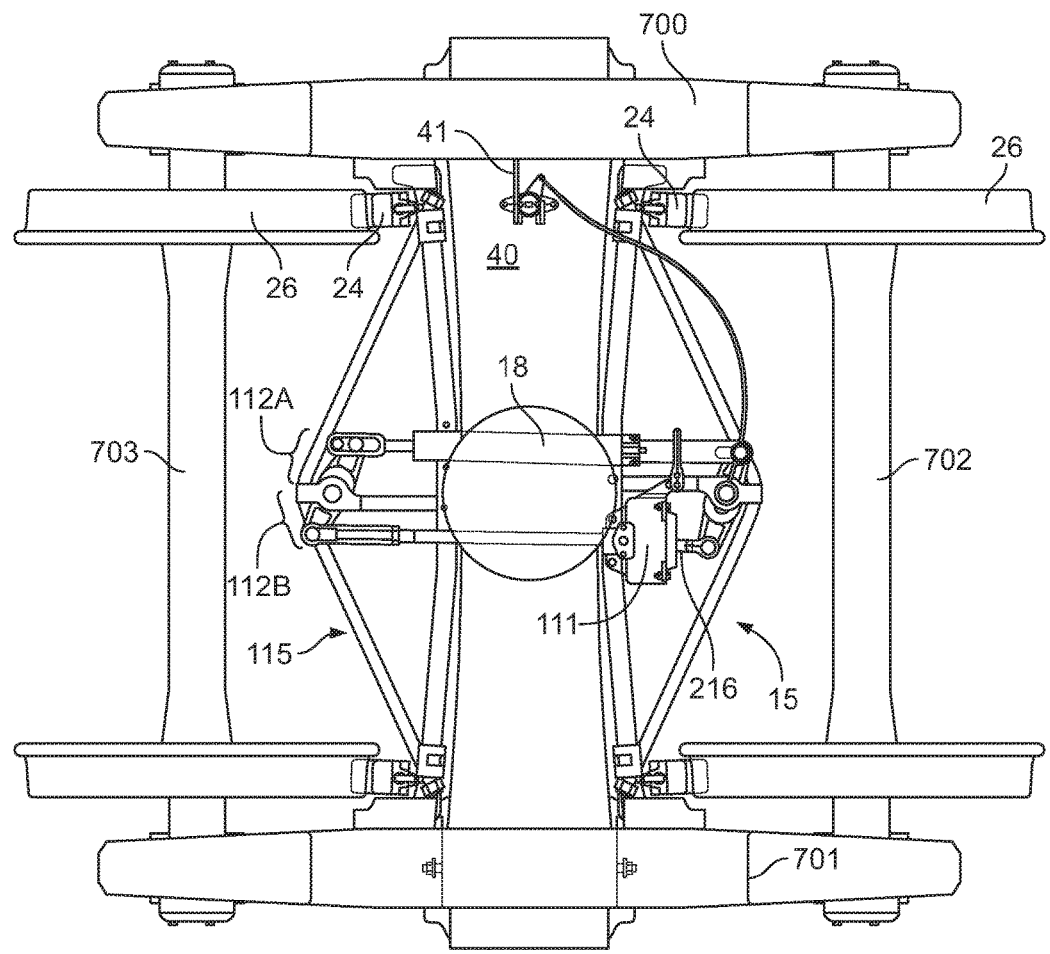
FIG. 2 is a view of the truck-mounted braking system from the top according to another embodiment of the invention, showing an installation on a railway car truck.

A truck-mounted braking system for a railway car according to one embodiment of the invention is shown in FIG. 1, including a first brake beam 15 and a second brake beam 115 separated along a longitudinal axis of the railway car. The ends of the brake beams 15, 115 are connected to brake heads 22, and brake shoes 24. As shown in FIG. 2, when the break beams are forced away from each other when the brakes are applied, the brake shoes apply force directly to the wheels 26. In embodiments, brake shoes 24 are made removable from brake heads 22 using a clip 25. In embodiments, tension member 121, 122 is mechanically secured to brake head 22, such as with a nut 171.

The first and second brake beams 15, 115 each have a compression member 123, 124 and a tension member 121, 122 and struts 14, 114 attached between the respective compression member 123, 124 and tension member 121, 122. In the embodiments shown, the brake actuator assembly includes an air cylinder 111, and an air cylinder push rod 216 operatively connected to the cylinder 111, adapted to move linearly in response to pressure in the air cylinder. Other brake actuators, such as a rolling diaphragm and an air bag are known in the art, and a person having ordinary skill in the art may adapt the construction of the braking system according to the principles described herein for use with these other types of brake actuators without departing from the scope of the invention.

In the embodiment shown in FIG. 1, brake system 10 comprises live lever 12 pivotally attached to first strut 14 by a pin 16 (called the "pivot pin"), and pivotally attached to the brake cylinder push rod 216 (obscured behind lever 12 in FIG. 1) by a suitable connection, such as a yoke and pin 13 on the lever connection element. Slack adjuster bar 18 is pivotally attached at an end of the live lever 12 on the opposite side of the pivot pin. In the embodiment shown, slack adjuster bar 18 is attached to lever 12 with a similar yoke 19 and pin 17. Dead lever 112 is pivotally attached to second strut 114, on opposing brake beam 115, pivotally attached at one end by pin 117 to the slack adjuster bar 18, and pivotally attached at the opposite end to the brake actuator assembly via return push rod 119 using a similar connection.

Characteristic of a truck-mounted system, the lever arms applying braking force are significantly shorter than they would be on a typical foundation brake rigging. In a foundation brake rigging system, each brake lever arm, i.e., on either side of the pivot, may be on the order of 18 inches. Adjusting the mechanical pivot point of such a large lever while maintaining precise operation poses a challenge. In contrast, the smaller lever arm(s) of the truck-mounted system (on the order of about 4-6 inches), allow for a more precise force adjustment. In the embodiment shown, dead lever 112 may be provided with one lever arm 112E longer than the other arm 112A. For example, the lever arm 112B between the slack adjuster 18 and pivot pin 116 through second strut 114 may be longer than the lever arm 112A between the return push rod 110 and pivot pin 116. In embodiments, it may be desirable to provide a pivot pin through hole on the dead lever that permits mechanical pivot adjustment according to the lading condition of the railway car. This may be as an alternative to, or in addition to, a pivot adjustment on the live lever, although less leverage is expected if the pivot adjustment is on the dead lever. In principle, the through hole can be provided in either lever. However, in the embodiment depicted in the Figures, the pivot adjustment having variable positions is on the live lever, as depicted in FIG. 3.

Figure 3:
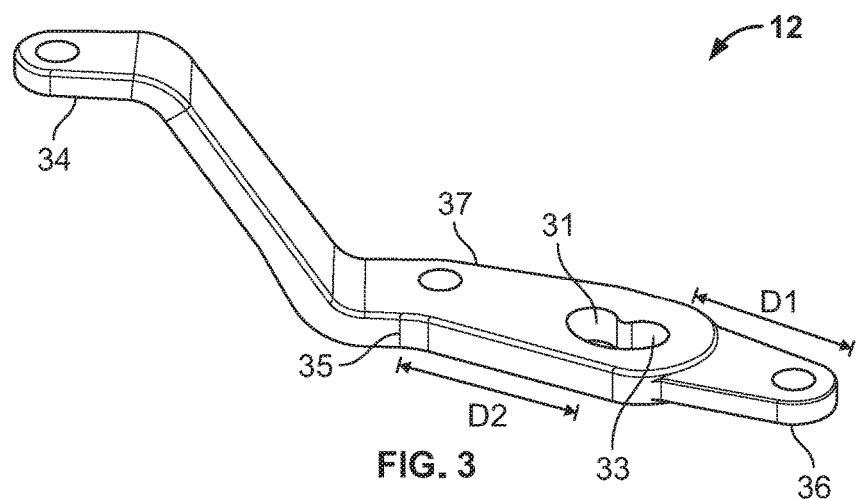
FIG. 3 depicts a live lever according to one embodiment of the invention.
Figure 4:
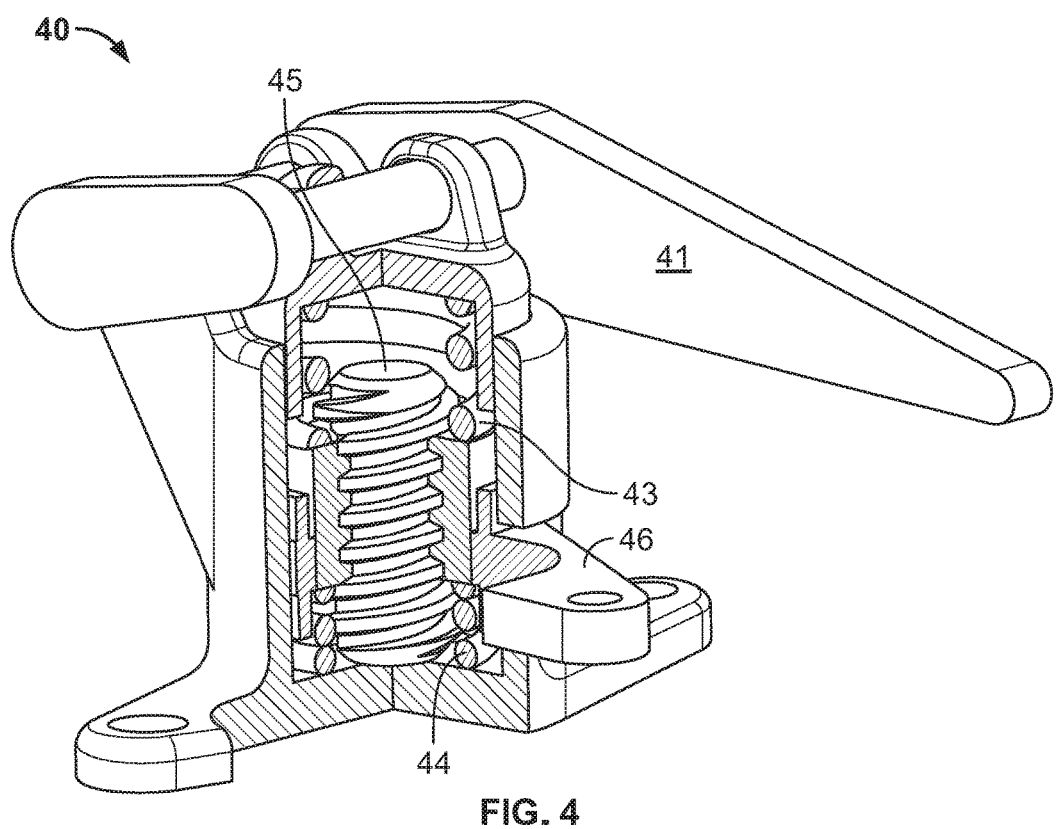
FIG. 4 is a view of a sensor assembly according to an embodiment of the invention.

As shown in FIG. 3, the pivot adjustment hole 31 allows adjustment of the lever arm distance D1 between the pivot pin and the slack adjuster and the distance D2 between the pivot pin and the brake actuator. In the embodiment shown, pivot adjustment hole 31 is crescent-shaped, with a recess adapted to receive pin 16 in different positions on opposite ends. When the car is loaded, pivot pin 16 is received in recess 33, and the lever arm D2 from the actuator to the pivot pin is longer than the lever arm D1 from the pivot pin to the slack adjuster. The larger moment arm results in a greater braking force being applied than when the actuator is closer to the pivot pin. A typical live lever in a truck-mounted brake system may have a length of about 12 inches between the brake actuator and the slack adjuster (although that distance is not critical to the invention). For a fully loaded car the distance between the actuator and the pivot pin may be about 6 inches, and the distance between the pivot pin and the slack adjuster may be about 4.5 inches (these specific dimensions are by way of example and not by way of limitation). When the car is unloaded, lever 12 shifts to a different position and pivot pin 16 is received in a different part of the through hole. The lever arms are thereby reversed, and the lever arm between the actuator and the pivot pin is about 4.5 inches and the distance between the pivot pin and the slack adjuster is about 6 inches, with the result that less braking force is transmitted to the wheels.

For example, and not by way of limitation, changing the pivot position by the amounts indicated above may result in a decrease to about 68% of a maximum braking force applied upon application of the hand brake in a loaded versus and unloaded railway car, and a decrease to about 56% of a maximum braking force applied upon application of the pneumatically activated brakes. Changing the pivot point longitudinally on the live lever, even by a small amount, has a profound impact on the braking ratio, and this is achieved without the need for a pneumatic empty load detector and the associated piping.

As shown in FIG. 3, one end of the live lever may be characterized by a hand brake connection portion 34 opposite the end of the live lever connected to slack adjuster 18. The hand brake connection portion 34 is at a different height and is positioned with respect to the brake beam to afford access and leverage to the hand brake (not shown) when applied. The live lever also includes a bend 35 in the longitudinal direction so that the lever is approximately crescent shaped when viewed in plan layout. Pivot adjustment 31 is located on the live lever between the slack adjuster connection 36 and the actuator connection 37, but offset slightly with respect to a line drawn from the center of the slack adjuster connection 36 and the actuator connection 37. The overall shape of the pivot adjustment through hole 31 itself is crescent shaped. The embodiment depicted in FIG. 2 shows the live lever without a handbrake connection.

Figure 5:
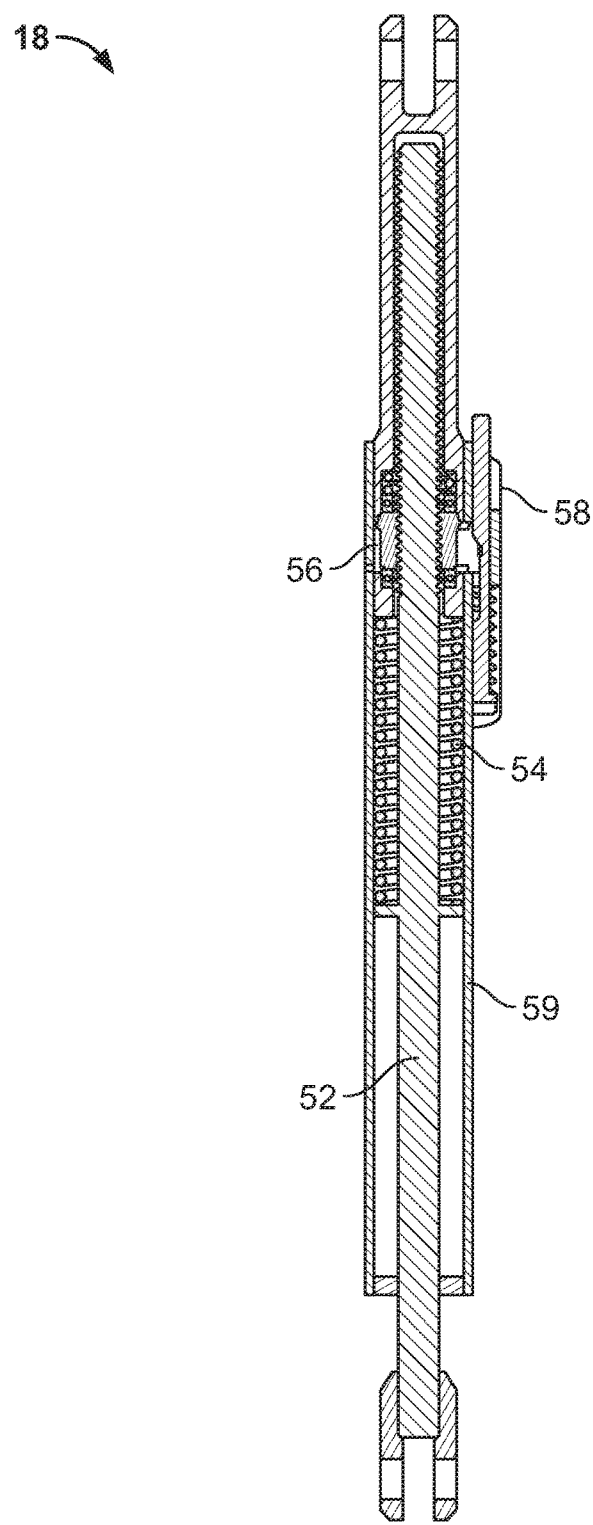
FIG. 5 is a cutaway view of a slack adjuster according to an embodiment of the invention.

The slack adjuster 18 itself, as shown in FIG. 5, may include a push rod 52 and a spring 54, adapted to exert a varying force on the brake shoes to accommodate for brake pad wear during operation. A pawl mechanism 56 is provided to ensure that the slack adjuster is neutral at rest. In the prior art, the pawl box 58 was typically welded on. An advantage is achieved by removably mounting the pawl box 58 on the slack adjuster outer housing, such that it can be easily assembled, non-destructively removed, and repaired.

A mechanical sensor 40, adapted to detect the loaded condition of the railway car and change the position of the pivot adjustment hole of the lever may be mounted on the bolster as shown in FIG. 2, although placement of the mechanical sensor may well vary depending on the truck design. In the embodiment shown, the mechanical sensor 40 comprises a sensor arm 41 in contact with an upper spring seat window of side frame 700, such that a loaded condition of the railway car corresponds to a larger space between the bolster and the side frame. Sensor arm 41 communicates with a set of springs 43, 44 in the sensor housing that prevents the pivot position from being altered when the brakes are already locked out, if the car is loaded after the handbrake is applied, for example. Output arm 46 on the sensor assembly may be mechanically connected to the live lever, rotating to apply force to the lever and alter the position of the pivot pin. Preferably, the mechanical attachment of the output arm 46 to the live lever is proximate the pivot adjustment hole and is rigid, to enable movement of the lever by pulling and pushing (i.e., whether the member is in tension or in compression).

The description of the foregoing preferred embodiments is not to be considered as limiting the invention, which is defined according to the appended claims. The person of ordinary skill in the art, relying on the foregoing disclosure, may practice variants of the embodiments described without departing from the scope of the invention claimed. A feature or dependent claim limitation described in connection with one embodiment or independent claim may be adapted for use with another embodiment or independent claim, without departing from the scope of the invention.

What is claimed is:

1. A truck-mounted braking system for a railway car, comprising,
    a first brake beam and a second brake beam separated along a longitudinal axis of the railway car, the first and second brake beams each having a compression member and a tension member, and a respective first and second strut attached between the respective compression member and tension member;
    a brake actuator;
    a brake actuator lever connection operatively connected to the brake actuator and adapted to move linearly in response to the brake actuator;
    a live lever pivotally attached to the first strut on the first brake beam by a pin, pivotally attached to the brake actuator lever connection, and pivotally attached at an end of the live lever to a slack adjuster;
    a dead lever, pivotally attached to the second strut on the second brake beam, pivotally attached at one end to said slack adjuster, and pivotally attached at an end opposite said one end, directly or indirectly, to the brake actuator; and
    a pivot adjustment hole in the live lever that receives the pin in at least two different positions in the hole, corresponding to at least two lading conditions of the railway car;
    wherein the pivot adjustment hole is a crescent-shaped aperture adapted to accommodate the pivot pin in said at least two positions at two opposed ends of the pivot adjustment hole.

2. The truck mounted braking system according to claim 1, wherein the live lever has a hand brake connection at one end adapted for mechanical connection to the hand brake.

3. The truck-mounted braking system according to claim 2, wherein the hand brake connection has a raised height relative to the pivot adjustment hole.

4. The truck-mounted braking system according to claim 1, wherein an end of the live lever opposite the slack adjuster is angled away from a line drawn through the brake actuator lever connection and the attachment of the lever to the slack adjuster.

5. The truck-mounted braking system according to claim 1, further comprising a sensor detecting the at least two lading conditions of the railway car, the sensor mounted to the railway car truck and mechanically connected to the live lever.

6. The truck-mounted braking system according to claim 5, wherein the sensor is mounted to a railway car bolster, and a lever on the sensor contacts a point on the side frame to detect a lading condition of the railway car.

7. The truck-mounted braking system according to claim 5, further comprising an output arm on the sensor having a rigid attachment to the live lever proximate the pivot adjustment hole, said attachment adapted to move the position of the pivot adjustment hole in tension and compression.

8. The truck-mounted braking system according to claim 1, wherein the slack adjuster includes a housing and a pawl box removably and mechanically mounted on the housing.

\* \* \* \* \*